(12) United States Patent
Chakrabartty et al.

(10) Patent No.: US 11,041,764 B2
(45) Date of Patent: Jun. 22, 2021

(54) SELF-POWERED SENSORS FOR LONG-TERM MONITORING

(71) Applicants: Shantanu Chakrabartty, St. Louis, MO (US); Liang Zhou, St. Louis, MO (US)

(72) Inventors: Shantanu Chakrabartty, St. Louis, MO (US); Liang Zhou, St. Louis, MO (US)

(73) Assignee: Washington University, St. Louis, MO (US)

( * ) Notice: Subject to any disclaimer, the term of this patent is extended or adjusted under 35 U.S.C. 154(b) by 370 days.

(21) Appl. No.: 16/079,848

(22) PCT Filed: Feb. 28, 2017

(86) PCT No.: PCT/US2017/019967
§ 371 (c)(1),
(2) Date: Aug. 24, 2018

(87) PCT Pub. No.: WO2017/151628
PCT Pub. Date: Sep. 8, 2017

(65) Prior Publication Data
US 2019/0094078 A1 Mar. 28, 2019

Related U.S. Application Data

(60) Provisional application No. 62/301,307, filed on Feb. 29, 2016.

(51) Int. Cl.
*G01K 1/14* (2021.01)
*G01K 3/04* (2006.01)
*G01H 11/06* (2006.01)
(52) U.S. Cl.
CPC ............... *G01K 3/04* (2013.01); *G01H 11/06* (2013.01)

(58) Field of Classification Search
USPC ......................................... 327/517; 374/178
See application file for complete search history.

(56) References Cited

U.S. PATENT DOCUMENTS 5,504,706 A 4/1996 D'Arrigo et al.
6,856,581 B1 2/2005 Berstis et al.
(Continued)

FOREIGN PATENT DOCUMENTS

EP 2860767 A1 4/2015

OTHER PUBLICATIONS

Zhou, et al., "Scavenging Thermal-noise Energy for Implementing Long-term Self-powered CMOS Timers," IEEE vol. 879-1-4673-5762, Mar. 13, 2013.
(Continued)

*Primary Examiner* — Lisa M Caputo
*Assistant Examiner* — Nasir U. Ahmed
(74) *Attorney, Agent, or Firm* — Armstrong Teasdale LLP

(57) ABSTRACT

A sensor system for detecting events is provided. The sensor system includes a sensor and a read-out interface. The sensor includes a transducer and a memory device. The transducer detects an event and generates a sensor signal in response to the event. The memory device includes a floating-gate with a sensing interface coupled to the transducer. The sensing interface has an energy barrier that leaks electrons at a predetermined electron leakage rate through Fowler-Nordheim (F-N) tunneling. The sensor signal alters a geometry of the energy barrier to change the electron leakage rate. The read-out interface is communicatively coupled to the memory device and retrieves data stored on the memory device for analysis. The event and a timestamp of the event are identifiable from the stored data.

19 Claims, 16 Drawing Sheets

(56) References Cited

U.S. PATENT DOCUMENTS

| | | | |
|---|---|---|---|
| 7,757,565 B2 | 7/2010 | Chakrabartty | |
| 8,056,420 B2 | 11/2011 | Chakrabartty et al. | |
| 8,177,423 B1 * | 5/2012 | Fair | G01K 7/38 |
| | | | 374/106 |
| 8,344,475 B2 * | 1/2013 | Shaeffer | G11C 13/0033 |
| | | | 257/528 |
| 8,902,627 B1 * | 12/2014 | Pesavento | G06K 19/0723 |
| | | | 365/145 |
| 8,963,647 B2 | 2/2015 | Chakrabartty | |
| 2001/0014033 A1 * | 8/2001 | Miyamoto | G11C 7/1048 |
| | | | 365/154 |
| 2006/0256617 A1 * | 11/2006 | Yano | H01L 27/11568 |
| | | | 365/185.13 |
| 2010/0096556 A1 | 4/2010 | Arsalan et al. | |
| 2014/0367631 A1 * | 12/2014 | Govoreanu | H01L 45/08 |
| | | | 257/4 |
| 2015/0162369 A1 | 6/2015 | Roizin et al. | |
| 2016/0293268 A1 * | 10/2016 | Jan | G11C 11/161 |

OTHER PUBLICATIONS

International Search Report and Written Opinion issued in PCT/US 2017/019967 dated Jun. 1, 2017.

* cited by examiner

SELF-POWERED SENSORS FOR LONG-TERM MONITORING

CROSS REFERENCE TO RELATED APPLICATIONS

This application claims priority to U.S. Provisional Application Ser. No. 62/301,307, filed 29 Feb. 2016, the entire disclosure of which is hereby incorporated by reference in its entirety.

STATEMENT REGARDING FEDERALLY SPONSORED RESEARCH & DEVELOPMENT

This invention was made with government support under Grant no. CMMI1533532 awarded by the National Science Foundation. The government has certain rights in the invention.

BACKGROUND

The field of the present disclosure relates generally to self-powered sensor systems, and more particularly, to self-powered sensors for recording timestamps of events monitored by the sensors and self-powered sensors for monitoring ambient temperature changes.

Some known sensors are used for long-term or low power monitoring applications. For example, such sensors may be used to monitor events such as micro-strain variations or mechanical impact. Some sensors are self-powered to facilitate long-term monitoring. In particular, the sensors may harvest energy from a sensor signal (i.e., the signal monitored by the sensor for events) to store sensor data in a non-volatile memory. The stored data may be retrieved from the memory at a later time to be analyzed and to identify events that have occurred.

In one example, the long term sensors include piezoelectricity driven hot-electron injection (p-HEI) sensors. p-HEI sensors include a sensor and a non-volatile memory. p-HEI sensors use the sensor signal to generate hot electrons that overcome an energy barrier of the non-volatile memory to store sensor data collected from the sensor signal. However, p-HEI sensors have a relatively high minimum energy requirement, also referred to as a threshold, determined by the energy barrier that limits the sensors' ability to sense events below the threshold. In addition, p-HEI sensors store the sensor data through an asynchronous process (i.e., only at times when electrons overcome the energy barrier). Accordingly, the p-HEI sensors do not store any time-of-occurrence data for the events identified in the sensor data. At least some sensors have been suggested that would use trap-assisted quantum tunneling in thermally grown oxides to detect events and to provide timestamps. However, variations of the trap density across different CMOS processes and the dynamics of trap generation make the approach difficult to implement reliably and consistently.

BRIEF DESCRIPTION

In one aspect, a sensor system for detecting events is provided. The sensor system includes a sensor and a read-out interface. The sensor includes a transducer and a memory device. The transducer detects an event and generates a sensor signal in response to the event. The memory device includes a floating-gate with a sensing interface coupled to the transducer. The sensing interface has an energy barrier that leaks electrons at a predetermined electron leakage rate through Fowler-Nordheim (F-N) tunneling. The sensor signal alters a geometry of the energy barrier to change the electron leakage rate. The read-out interface is communicatively coupled to the memory device and retrieves data stored on the memory device for analysis. The event and a timestamp of the event are identifiable from the stored data.

In another aspect, a sensor for detecting events is provided. The sensor includes a transducer and a memory device. The transducer detects an event and generates a sensor signal in response to the event. The memory device includes a floating-gate transistor with a sensing interface coupled to the transducer. The sensing interface has an energy barrier that leaks electrons at a predetermined electron leakage rate through Fowler-Nordheim (F-N) tunneling. The sensor signal alters a geometry of the energy barrier to change the electron leakage rate. The event and a timestamp of the event are identifiable from data stored on the memory device.

In yet another aspect, a method for detecting events using a sensor including a transducer and a memory device including a floating-gate transistor with a sensing interface coupled to the transducer is provided. The sensing interface has an energy barrier configured to leak electrons at a predetermined electron leakage rate through Fowler-Nordheim (F-N) tunneling. The method includes detecting, by the transducer, an event, generating a sensor signal in response to the event, altering a geometry of the energy barrier in response to the sensor signal, and storing, at the floating-gate, data associated with the electron leakage rate. Modulating the geometry changes the electron leakage rate. The event and a timestamp of the event are identifiable from the stored data.

In a further aspect, a sensor system for monitoring ambient temperature of an object is provided. The sensor system a sensor disposed adjacent an object and a read-out interface. The sensor includes a memory device. The memory device includes a floating-gate with a sensing interface having an energy barrier that leaks electrons at a predetermined electron leakage rate through F-N tunneling. The electron leakage rate varies at least partially as a function of an ambient temperature of the sensor. The read-out interface is communicatively coupled to the memory device and retrieves data stored on the memory device for analysis.

In another aspect, a method for monitoring ambient temperature of an object is provided. The method includes disposing a sensor adjacent the object. The sensor includes a memory device. The memory device includes a floating-gate with a sensing interface having an energy barrier that leaks electrons at a predetermined electron leakage rate through F-N tunneling. The electron leakage rate varies at least partially as a function of an ambient temperature of the sensor. The method further includes altering a geometry of the energy barrier in response to a change in ambient temperature and thereby change the electron leakage rate. The method also includes storing, at the floating-gate, data associated with the electron leakage rate.

DETAILED DESCRIPTION

The systems and methods described herein are generally related to sensor systems, and more particularly, self-powered sensors for recording timestamps of events monitored by the sensors and monitoring ambient temperature changes.

The systems described herein include one or more self-powered sensors for monitoring events. As used herein, an "event" refers to a measurement value collected by the sensors that exceeds a predetermined threshold. For example, if the sensor is monitoring vibrations, an event may be a vibration that exceeds a typical vibration. The sensors include a memory device with a floating-gate transistor that continuously leaks electrons at a predefined rate. The changing voltage in the floating-gate resulting electron leakage is used as a clock to allow a timestamp to be determined for events detected by the sensor. To detect events, the sensors include a transducer that generates a sensor signal in response to an event. The sensor signal modulates the memory device to change the rate of electron leakage. More particularly, the sensor signal modulates a geometry (size and/or shape) of an energy barrier of the floating-gate to change the rate of electron leakage. When the stored data is analyzed, an unexpected change in the rate of electron leakage typically indicates an event occurred and was detected by the sensor. The measurement value (i.e., magnitude) and the timestamp of the event may be identified or reconstructed for analysis based on the sensor data retrieved from the memory device.

Figure 1:
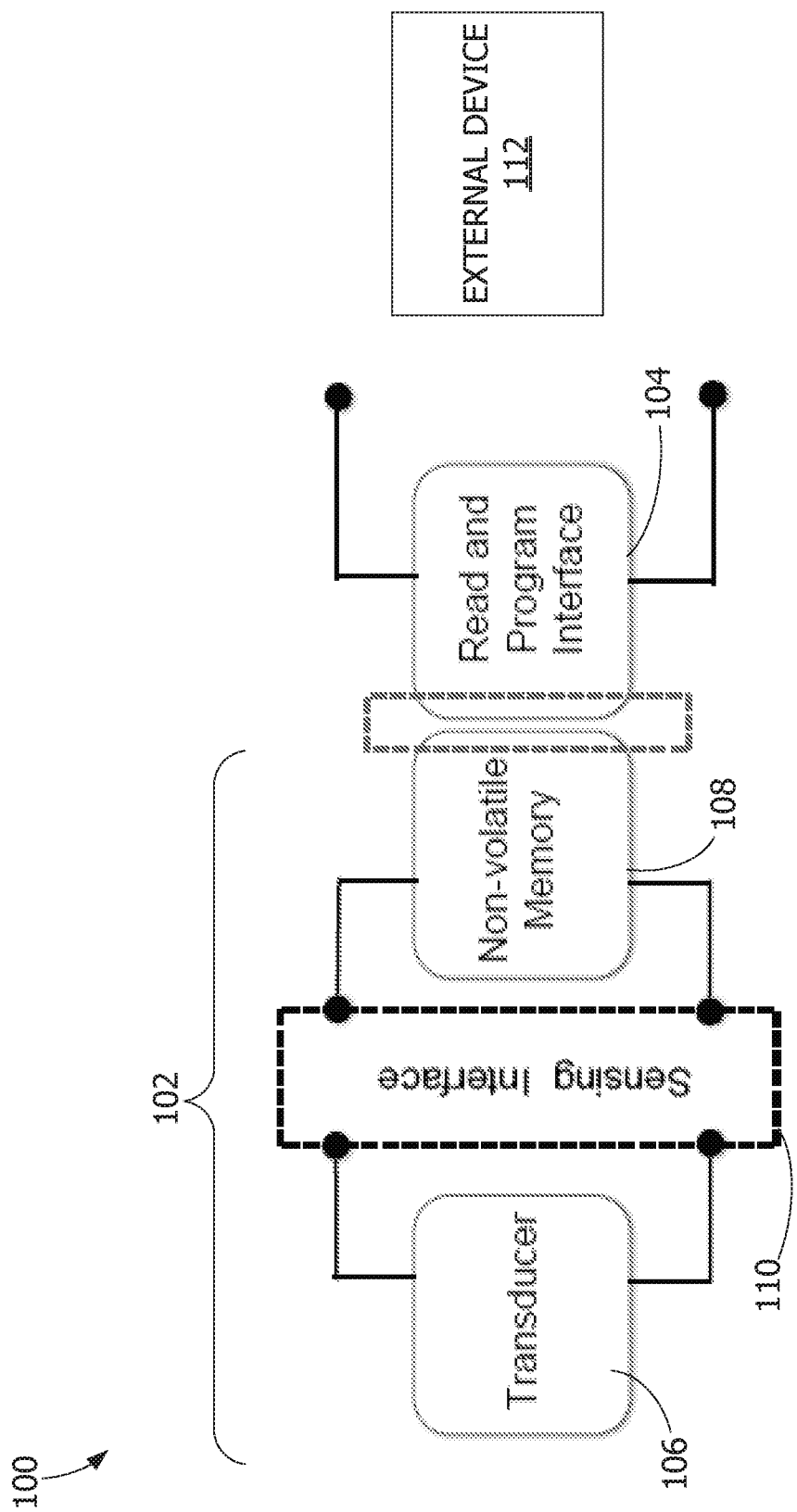
FIG. 1 is a schematic block diagram of an example sensor system for monitoring events.

FIG. 1 is a schematic block diagram of an example sensor system 100 for monitoring events. In the example embodiment, sensor system 100 includes a sensor module 102 and a read-out interface 104. The sensor module 102 includes a transducer 106, a memory device 108, and a sensing interface 110. In other embodiments, system 100 may include additional, fewer, or alternative components, including those described elsewhere herein. For example, the system 100 may include a plurality of sensor modules 102.

The transducer 106 is configured to collect or receive data (sometimes referred to as "sensor data") from an external system (not shown) monitored by the system 100. The transducer 106 may be a piezoelectric transducer or another suitable type of transducer. The collected data may include, for example, micro-strain data, mechanical impact data, vibration data, or other data. The transducer 106 is configured to convert the collected sensor data into an electrical signal referred to as the "sensor signal". The sensor signal is a function of the collected sensor data. In the example embodiment, the transducer 106 continuously monitors the external system and outputs a sensor signal corresponding to the monitored characteristic (e.g., vibration, strain, etc.) of the external system. In particular, the sensor signal is configured to distinctly identify the occurrence or absence of an event within the monitored external system. In other embodiments, the transducer 106 selectively generates the sensor signal. For example, the transducer 106 may generate the sensor signal in response to collecting sensor data above a predetermined threshold that may be associated with an event.

The memory device 108 includes a semiconductor floating-gate transistor configured to provide non-volatile memory for storing data. In particular, the memory device 108 may be a complementary metal-oxide semiconductor (CMOS), such as a typical 0.5 µm CMOS. In other embodiments, the memory device 108 may include another type of non-volatile memory. The memory device 108 enables the system 100 to store data associated with one or more events monitored by the transducer 106 for long-term storage. The memory device 108 may use a reduced amount of power to store the data. In some embodiments, after having an initial voltage stored on the floating-gate, the memory device 108 may not use power to maintain the data.

The sensing interface 110 is located between the transducer 106 and the memory device 108. In the example embodiment, the sensing interface 110 is integrated with the floating-gate of the memory device 108. In some embodiments, the memory device 108 and the sensing interface 110 are separate components. The sensing interface 110 is configured to continuously leak electrons across the energy barrier of the floating-gate into the memory device 108 using Fowler-Nordheim (F-N) tunneling, as described further below. The electrons leak through the energy barrier of the sensing interface 110 at a predefined rate or function of time. Accordingly, by recording an initial state (e.g., voltage and/or time) of the sensing interface 110 and monitoring the voltage at the sensing interface 110 over time, a timestamp relative to the time of the initial state may be determined. The memory device 108 is configured to store data associated with the leakage of electrons from the sensing interface 110. For example, the memory device 108 may have a voltage associated with the electron leakage. Additionally or alternatively, the memory device 108 may store other data associated with the sensing interface 110.

The sensing interface 110 may be adjustable to calibrate the rate of electron leakage based on a predefined sensing period (i.e., an interval before the stored data will be retrieved from the sensor 102). That is, the rate of electron leakage is adjusted such that unexpected changes in the electron leakage (e.g., voltage drops) are identifiable from the standard electron leakage over the entire sensing period.

The sensor signal from the transducer 106 is used to modulate the geometry (size and/or shape) of the energy barrier of the sensing interface 110 based on events monitored by the transducer 106. Modulating the geometry of the energy barrier changes the rate at which the electrons leak through the energy barrier. If an event is sensed by the transducer 106, the resulting sensor signal alters the energy barrier such that data associated with the event is identifiable or reconstructable from the stored data.

Figure 2:
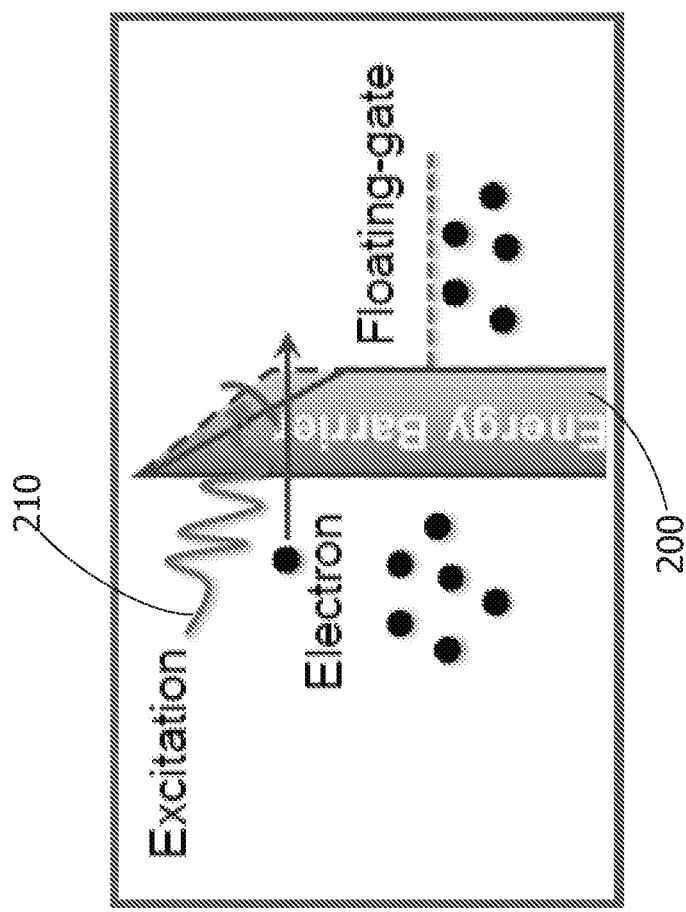
FIG. 2 is a graphical representation of an energy barrier in the sensor system shown in FIG. 1.

With reference to FIG. 2, an energy barrier 200 is modulated by a sensor signal 210 to enable the electrons to leak through the energy barrier 200 at an increased rate. The energy required to tunnel through the energy barrier 200 using F-N tunneling may be between $10^{-15}$ W and $10^{-12}$ W. In comparison, for p-HEI-based sensors, the sensor signal typically uses $10^{-9}$ W and $10^{-6}$ W to overcome the energy barrier. Accordingly, events that generate a sensor signal below the energy threshold to overcome the barrier may not be detected.

With reference again to FIG. 1, in one example, the leakage from the energy barrier is defined by a decaying voltage over time function. If an event occurs, the resulting sensor signal increases the rate at which the electrons leak through the energy barrier. Accordingly, the voltage drops at an increased rate until the sensor signal associated with the event is removed. When the stored data is retrieved, a function of the measured data (i.e., the voltage) over time is generated or interpolated. The interpolated function is compared to a model function that is calculated based on the initial voltage stored in the memory device 108 and the predefined rate of electron leakage. If the interpolated and model functions do not substantially match, an event and a timestamp relative to the initial state may be identified and recorded. In some embodiments, data values associated with the event such as force, heat, luminosity, and other values may be calculated based on the comparison of the functions.

To retrieve the data stored by the memory device 108, the read-out interface 104 is communicatively coupled to the memory device 108. In some embodiments, the read-out interface 104 is physically coupled to the memory device 108 (e.g., via wires or electrical contacts). In one example, read-out interface 104 includes an antenna for facilitate wireless communication. In other embodiments, the read-out interface 104 may be wirelessly coupled to the memory device 108. For example, the read-out interface 104 may use radio frequency (RF) communication, Bluetooth, ultrasound, or other wireless communication methods to access the stored data from the memory device 108. The stored data is collected by the read-out interface 104. In at least some embodiments, the read-out interface 108 is further configured to facilitate energizing and/or programming the sensor 102. That is, the read-out interface 108 is configured to receive energy and/or programming instructions and adjust operation of the sensor 102 accordingly.

In the example embodiment, the read-out interface 108 is communicatively coupled to an external device 112. The external device 112 is configured to interrogate the read-out interface to retrieve the data stored by the memory device 104. In at least some embodiments, the external device 112 is configured to program the sensor 102 for a particular implementation. To collect the data, the external device 112 is wirelessly coupled to the read-out interface and transmits energy to the read-out interface 108. When energized, the read-out interface 108 automatically retrieves the data stored by the memory device 104 and transmits the data to the external device 112. In one example, the external device 112 includes an RF identification (RFID) reader and the read-out interface 108 includes an RF antenna coupled to the memory device 104. When the external device 112 is within a predefined distance of the read-out interface 108, energy from the device 112 energizes the read-out interface 108 and facilitates transmission of the data stored by the memory device. In at least some embodiments, energy used to retrieve the stored data may be used for subsequent monitoring and/or electron leakage by the sensor 102. In other embodiments, the data stored by the memory device 104 may be retrieved by the external device 112 using a different process. In one example, the external device 112 is coupled to the read-out interface 108 in a wired configuration. In another example, the external device 112 may be communicatively coupled to the read-out interface using Bluetooth, ultrasound, and/or other wireless communication methods.

Figure 3:
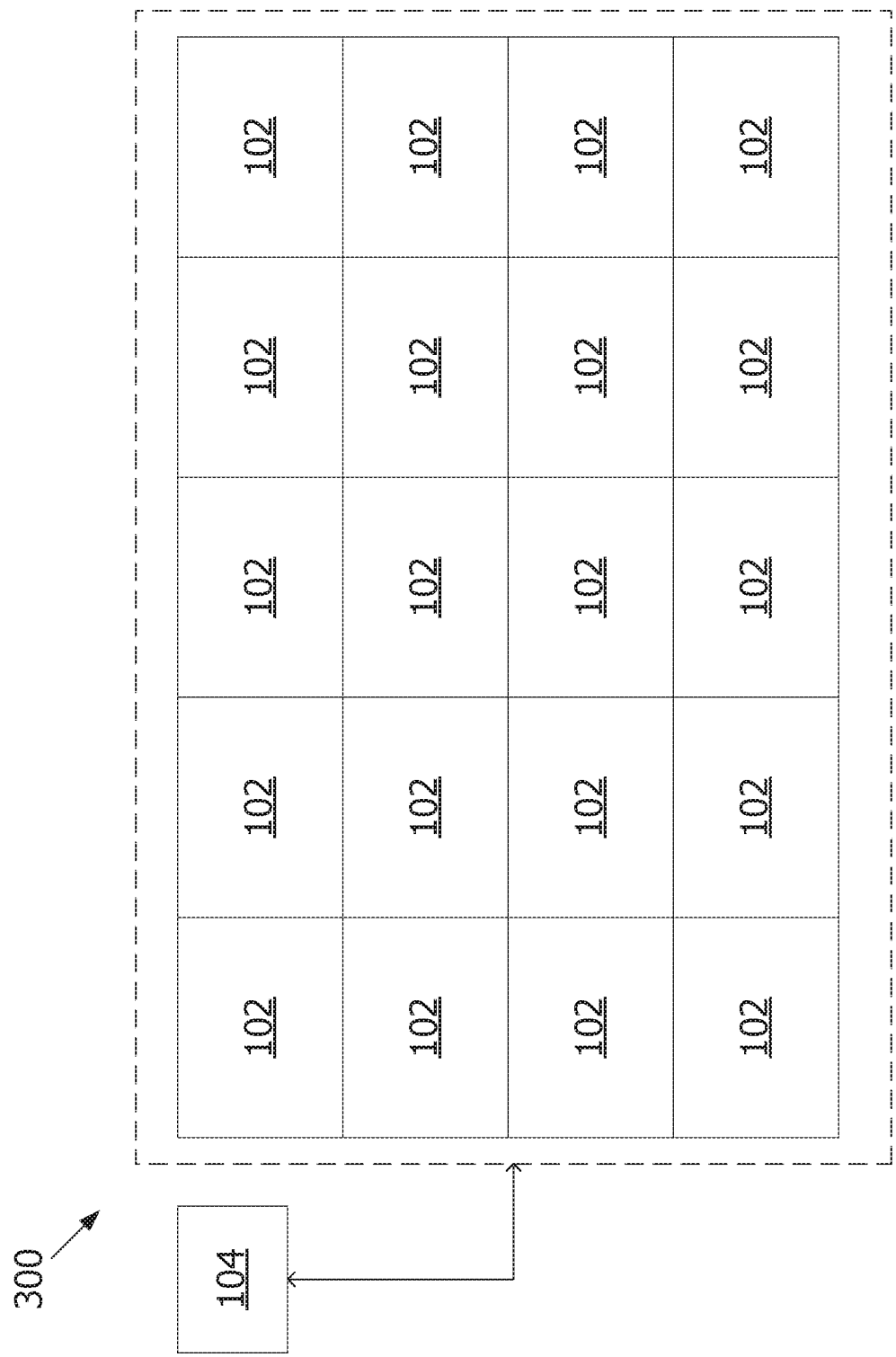
FIG. 3 is a schematic block diagram of an example sensor array including sensors systems such as the system shown in FIG. 1.

FIG. 3 is a schematic block diagram of a sensor array 300 that includes the sensor system 100 show in FIG. 1. The sensor array 300 may be used to detect multiple events occurring over a period of time. In the example embodiment, the sensor array 300 includes a plurality of the sensors 102 (shown in FIG. 1) that monitor an external system or area. The sensor array 300 further includes one read-out interface 104 to retrieve data stored at the sensors 102. In some embodiments, the sensor array 300 includes more than one read-out interface 104. In other embodiments, each sensor 102 has a dedicated read-out interface similar to the system 100. In at least one embodiment, the sensor array 300 includes one or more transducers 106 (shown in FIG. 1) that collects data for at least a portion of the sensors 102 of the array 300.

In the example embodiment, at least some of the sensors 102 may be calibrated with a different electron leakage function. These different electron leakage functions may be used to identify and reconstruct multiple events and corresponding timestamps. Additionally, the sensors 102 may be configured with different thresholds for detecting events.

Figure 4:
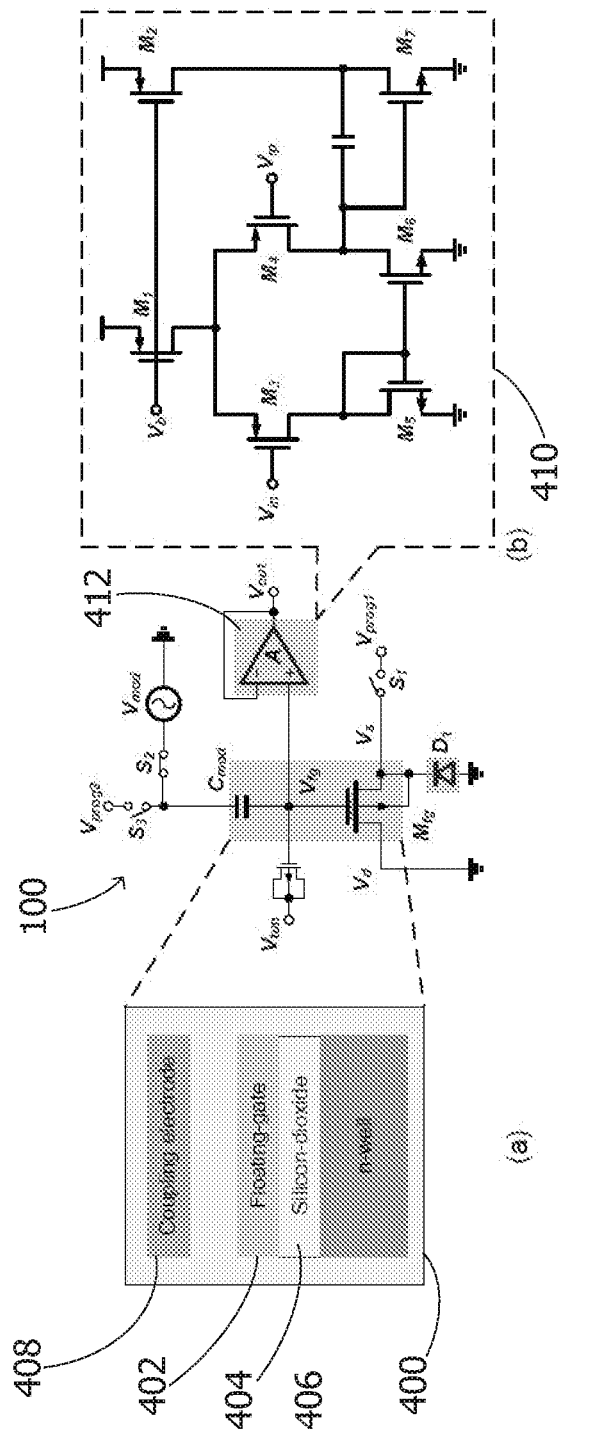
FIG. 4 is a circuit diagram of the sensor system shown in FIG. 1.

FIG. 4 is a circuit diagram of a portion of the sensor system 100 shown in FIG. 1. A cross-section of the sensing interface 110 (shown in FIG. 1) is shown in box 400 and includes a floating-gate 402, a silicon dioxide layer 404, a doped n-well 406, and a coupling electrode 408 from the transducer 106 (shown in FIG. 1). It is to be understood that the silicon dioxide layer 404 and the n-well 406 may be a different semiconductor dioxide and doped region, respectively. In at least some embodiments, the floating-gate 402 is a polysilicon layer that is isolated by the silicon dioxide layer 404 from the n-well 406. The silicon dioxide layer 404 forms an energy barrier preventing the electrons from the n-well 406 to thermally surmount into the floating-gate 402 and the thickness of the barrier is above a predefined value to prevent direct quantum tunneling of the electrons. Thus, if the voltage of the floating-gate 402 ($V_{fg}$) is kept below a threshold value (e.g., less than 3.3 V for a 0.5-μm CMOS process), the leakage of electrons may be practically negligible. For a voltage $V_{fg}$ above the threshold value, the electric field across the barrier causes the shape of the barrier to change which enables electrons to leak to the floating-gate node (i.e., the node of $V_{fg}$) through F-N tunneling.

Equation 1 defines the F-N tunneling current density J as a function of an electric field E across the silicon dioxide layer 404 and a pair of physical parameters α and β. Equation 1 is expressed as:

$$J = \alpha E^2 \exp\left(-\frac{\beta}{E}\right) \quad (1)$$

The physical parameters α and β are defined in Equations 2 and 3 as functions of the mass and charge of an electron m and q, a height of the energy barrier φ, and Plank's constant h. Equations 2 and 3 are expressed as:

$$\alpha = \frac{q^3}{8\pi h \varphi} \quad (2)$$

$$\beta = \frac{8\pi(2m)^{1/2}\varphi^{3/2}}{3hq} \quad (3)$$

The differential or change of the voltage $V_{fg}$ of the floating-gate 402 depends on a capacitance $C_T$ and differential of a charge Q of the floating-gate 402 or the current density J and a tunneling junction area A as shown in Equation 4, which is provided below:

$$dV_{fg} = \frac{dQ}{C_T} = \frac{AJdt}{C_T} \quad (4)$$

The voltage $V_{fg}$ and the electric field E are related to each other by an oxide thickness $t_{ox}$ of the silicon dioxide layer 404 offset by an effective voltage drop across the substrate $V_{sub}$. Equation 5 defines the relationship as:

$$V_{fg} = t_{ox}E + V_{sub} \quad (5)$$

By integrating Equations 1, 4, and 5, the electric field is expressed in terms of two constants $k_0$ (including an initial electric field $E_0$ across the silicon dioxide layer 404) and $k_1$ as shown in Equation 6:

$$E = \frac{\beta}{\ln(k_1 t + k_0)} \text{ where } k_0 = \exp\left(\frac{\beta}{E_0}\right), k_1 = \frac{A\alpha\beta}{C_T t_{ox}} \quad (6)$$

After substituting the electric field E from Equation 6 into Equation 5, the voltage $V_{fg}$ is expressed in Equation 7 as:

$$V_{fg} = \frac{\beta t_{ox}}{\ln(k_1 t + k_0)} + V_{sub} \quad (7)$$

Equation 7 shows that the floating-gate voltage $V_{fg}$ is monotonic with respect to time (i.e., decreases with time) and is a function of the initial charge on the floating-gate 402 as modeled by the constant $k_0$. The rate of change of the voltage $V_{fg}$ may be adjusted by changing the tunneling junction area A and the capacitance $C_T$, both of which are determine the constant $k_1$.

In the example embodiment, the circuit diagram of the read-out interface 104 (shown in FIG. 1) is illustrated within a cutout 410. The sensor signal $V_{mod}$ is coupled onto the floating-gate 402 through a modulation capacitor $C_{mod}$. The charge Q on the floating-gate 402 is initialized either by hot-electron injection through the transistor $M_{fg}$ or by quantum tunneling through a parasitic thin-oxide capacitor (not shown). Switches $S_1$ to $S_3$ are digitally programmed to select operation mode as sensing, programming or reading. The transducer 106 (shown in FIG. 1) modulates a voltage $V_{mod}$. Equation 8 defines the differential change in floating-gate voltage $dV_{fg}$ as:

$$dV_{fg} = \frac{dQ}{C_T} + \frac{C_{mod}}{C_T} dV_{mod} \quad (8)$$

A unity-gain buffer 412 is used for reading out the voltage $V_{fg}$ as shown in the box 310. To avoid hot-electron injection through the gates of the input transistors of the unity-gain buffer 412, during the self-powering mode the power to the buffer 412 is disabled. During the read-out mode the supply voltage $V_s$ of the floating-gate is set to 3.3 V and the modulation node $V_{mod}$ is pulled low such that the floating-gate voltage $V_{fg}$ is also below 3.3V.

Figure 5:
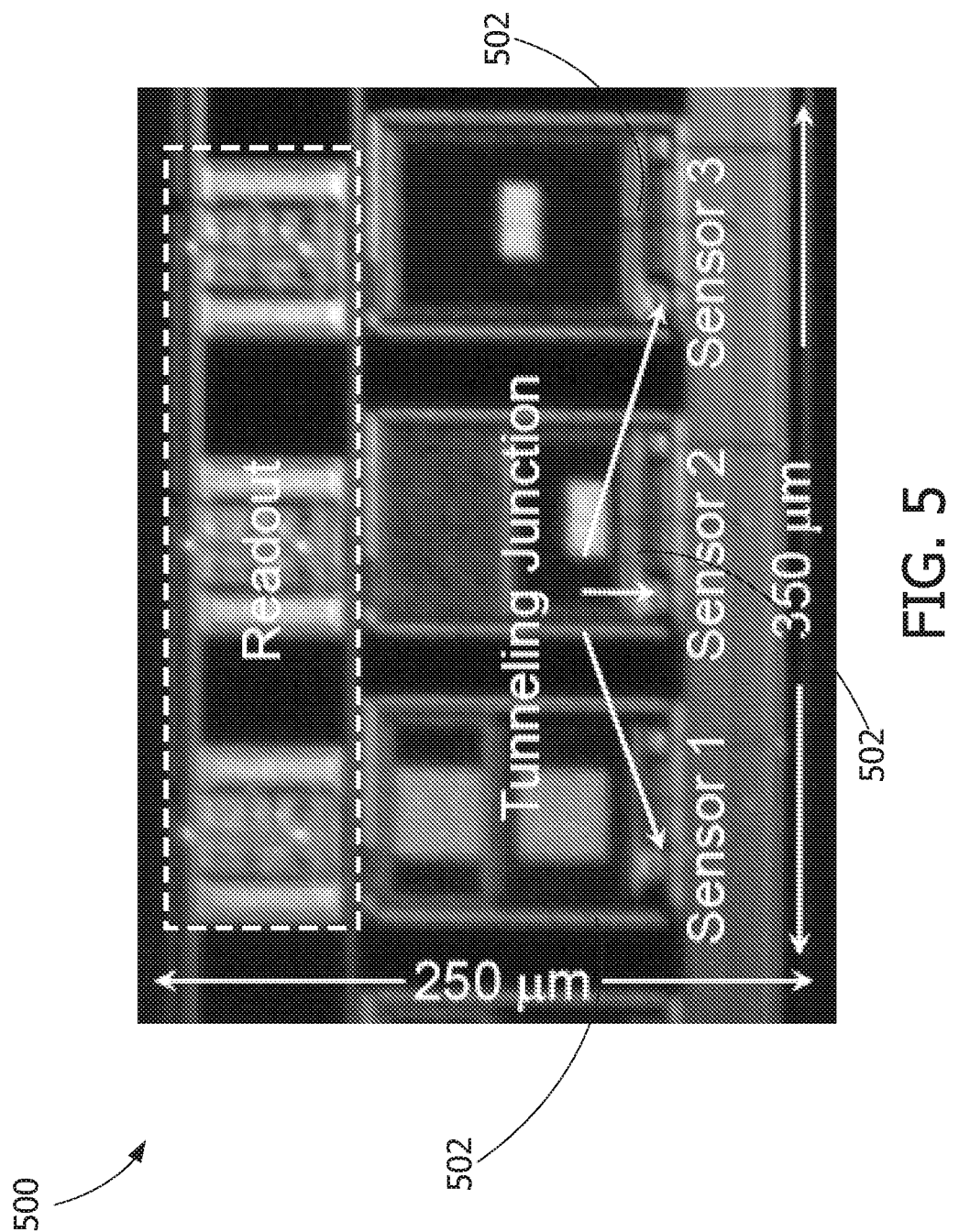
FIG. 5 is a micrograph of an example sensor array that may be the sensor array shown in FIG. 3.

In one experiment, sensor circuits similar to the circuit shown in FIG. 4 were prototyped in a 0.5 μm CMOS process. FIG. 5 is an example micrograph of a fabricated sensor array 500. In the example embodiment, the sensor array 500 occupies an area of 350×250 μm² and includes three sensors 502, each sensor 502 having different tunneling and floating-gate cross-sectional areas. In other embodiments, the sensor array 500 may include a different number of sensors 502 (including one).

Figure 6:
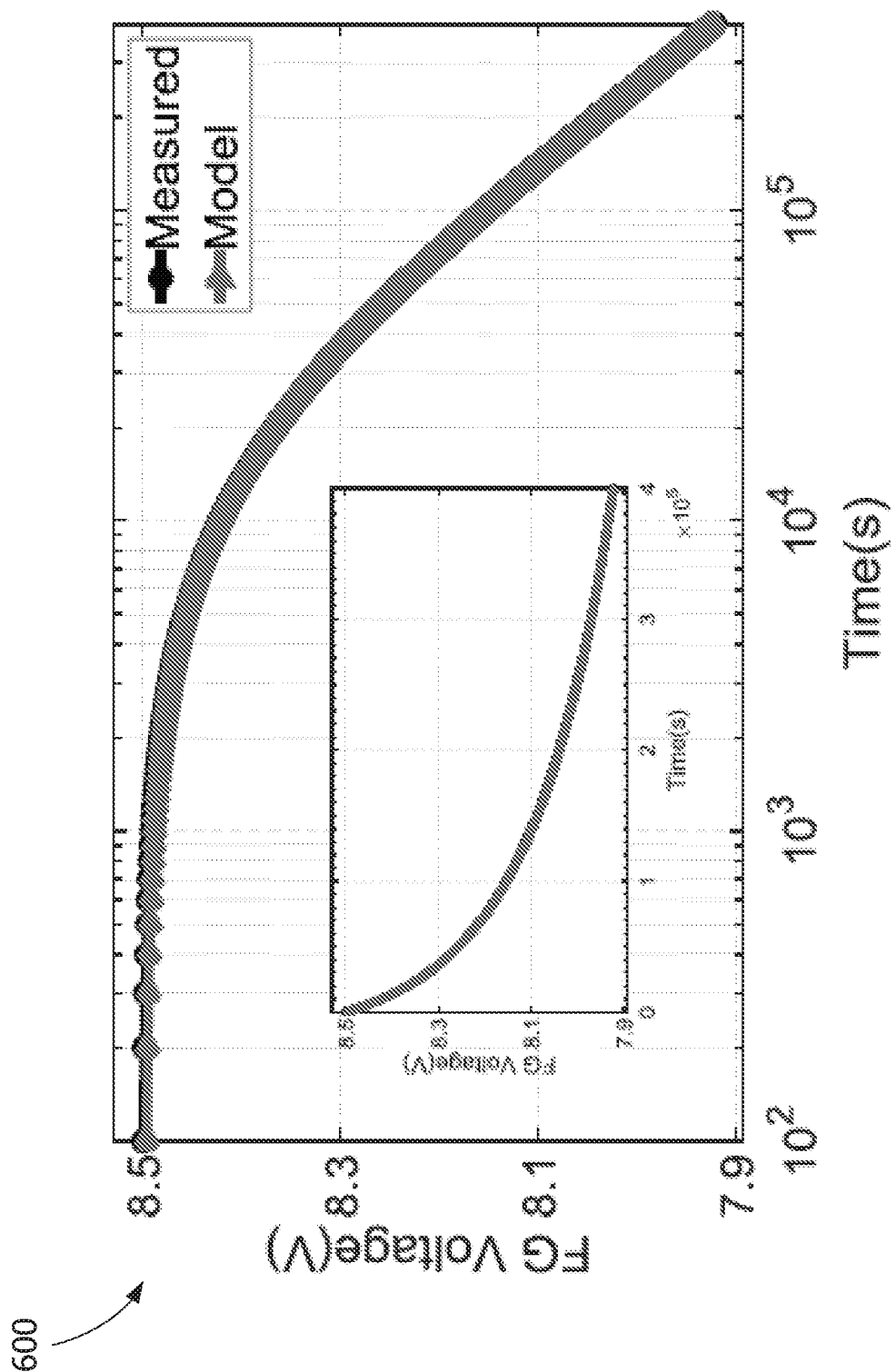
FIG. 6 is a graph comparing measured voltage characteristics from the system shown in FIG. 1 to model characteristics over time.

A first set of measurements was designed to demonstrate the working principle of the F-N tunneling sensor 502 and validate its response against a mathematical model given by Equation 7. FIG. 6 is a graph 600 depicting a comparison between measured data from the sensors 402 and the model calculations. The parameters for the model calculations were obtained using a regression fit to the measured data. Table 1 includes some of the model parameters. The graph 600 shows that the model given by Equation 7 and the measured data substantially match. Accordingly, the model captures the F-N tunneling response and may be used for timer calibration and algorithm design.

TABLE 1

| Parameter | Value |
| --- | --- |
| $\beta t_{ox}$ | 69.85 |
| $k_0$ | 2.495 × 10⁷ |
| $k_1$ | 931.5 |
| $V_{sub}$ | 4.395 |

Figure 7:
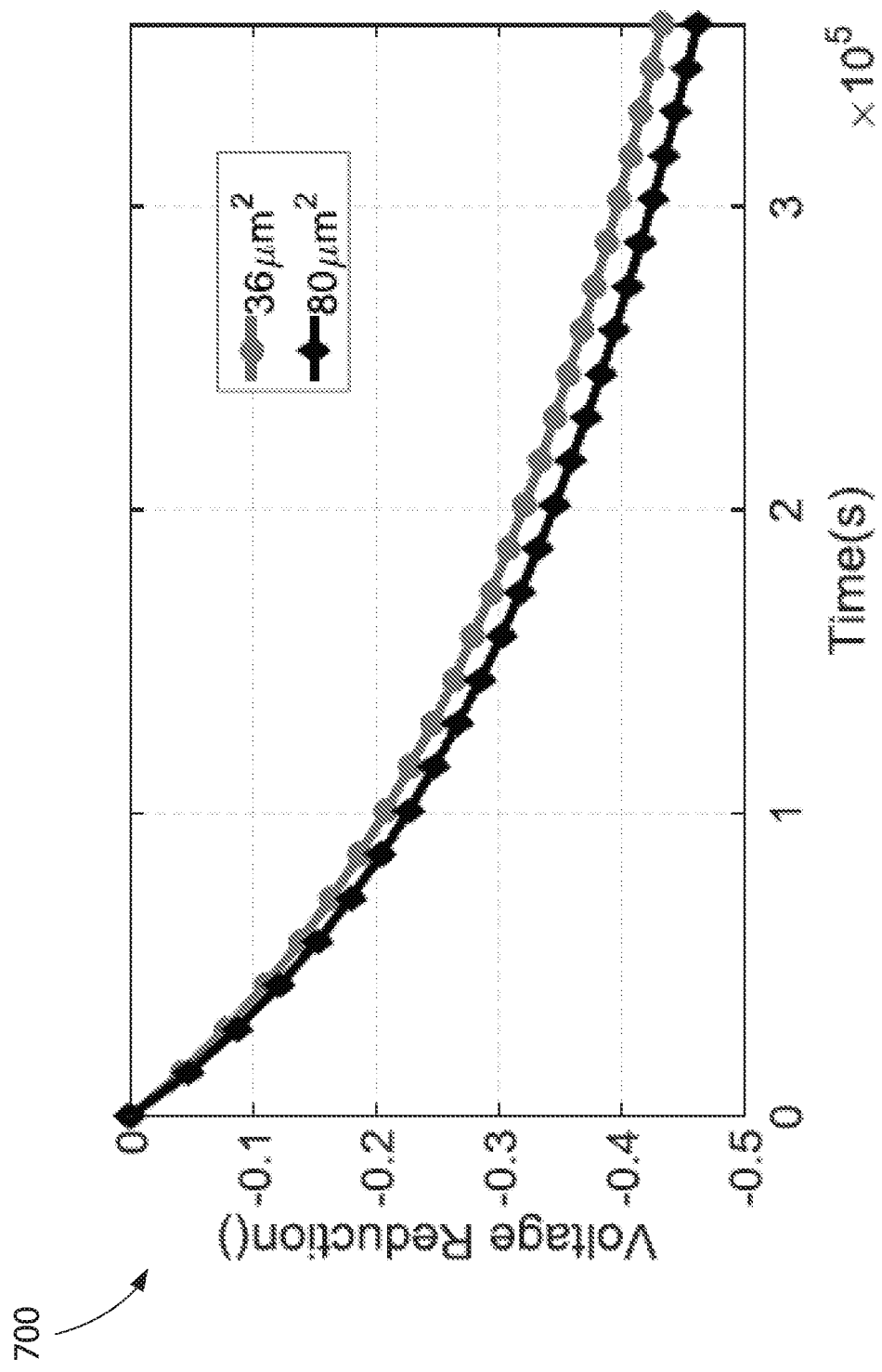
FIG. 7 is a graph comparing measured voltage characteristics from the system shown in FIG. 1 using two different tunneling junction areas.

A second set of experiments was designed to demonstrate that the timer responses could be adjusted by changing the parameter $k_1$ in the Equation 7. FIG. 7 is a graph 700 depicting the timer responses for two different values of the tunneling cross-sectional areas A, which determine $k_1$. Increasing the tunneling cross-sectional area A corresponds to an increased tunneling rate which may be used to modulate the duration of the sensing period and sensitivity of the sensor 502 shown in FIG. 5.

A third set of experiments were designed to demonstrate the application of the F-N sensor 502 for sensing and time-stamping. As described above with respect to FIG. 4, the sensor signal is applied to the modulation capacitor $C_{mod}$ and this reflects a change in the timer response. The experiments were divided into two categories: (a) a control experiment where the sensor 502 was allowed to leak and no modulation signal was applied; and (b) for the same sensor 502, different modulation signals were applied and its effect was measured. To simulate detecting and measuring the effect of rare events, the sensor signal was simulated by applying a voltage pulse every 9000 seconds.

Figure 8:
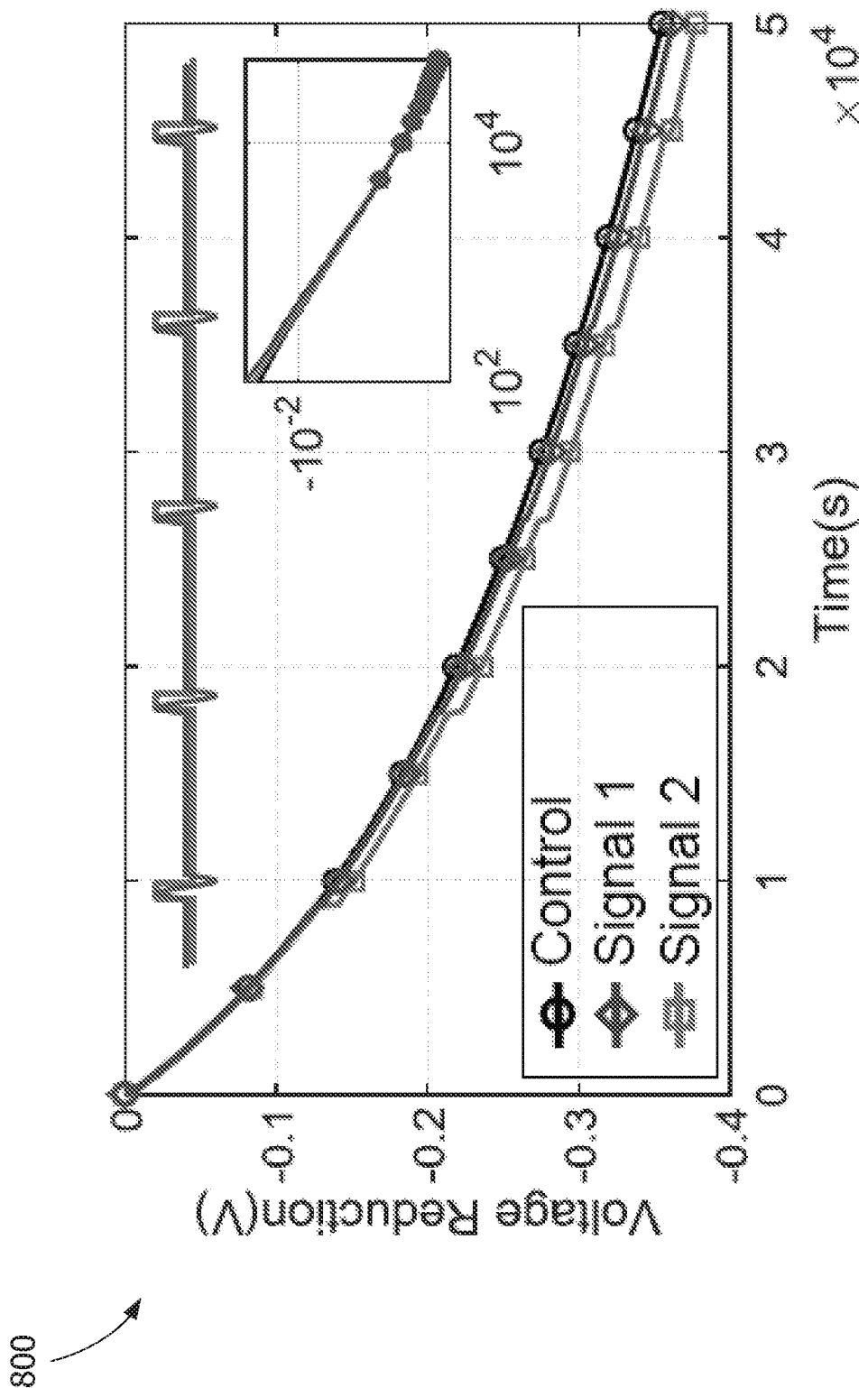
FIG. 8 is a graph comparing measured voltage characteristics from the system shown in FIG. 1 for a control signal and two modulation pulses.

FIG. 8 is a graph 800 depicting a voltage reduction over time based on a control signal and a pair of modulated pulses applied to the sensor 502. In the example experiment, a sinusoidal pulse with a 1 V peak-to-peak amplitude with a frequency of 1 Hz was used for the first modulated signal ("Signal 1"), and a square pulse with 1V amplitude was used as the second modulated signal ("Signal 2"). Both modulated signals were applied to the modulation capacitor $C_{mod}$ for a duration of 20 seconds as shown in the inset of FIG. 8. The sinusoidal pulses emulate an output of a capacitive transducer such as an output of an accelerometer or a piezoelectric transducer. The square pulses emulate the output of a low-impedance transducer such as a photo-diode or a temperature sensor. For both modulated signals, the sensor signal is charging an input capacitance of 100 fF, indicating that the maximum energy drawn for each pulse is approximately 50 fJ. This level of energy may be delivered by most sensing transducers.

Figure 9:
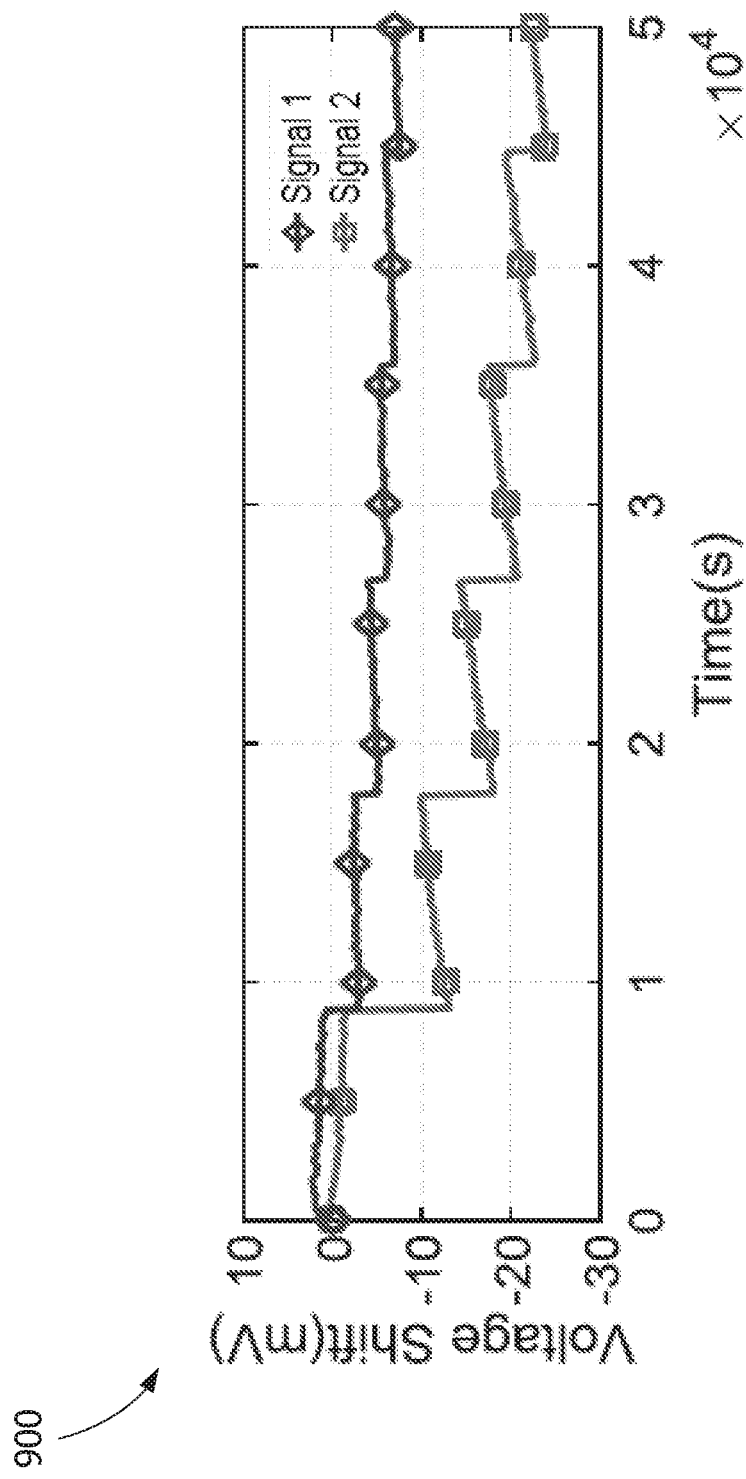
FIG. 9 is a graph comparing the measured voltage shift for each modulation pulse shown in FIG. 8 from the control signal.

FIG. 9 is a graph 900 depicting the difference ("voltage shift") between each of the modulated signals and the control signal shown in FIG. 8. The square pulse signal has a greater difference in relation to the difference of the sinusoidal pulse signal because square pulses have more energy in comparison to corresponding sinusoidal signals. These differences indicate that the sensors detect and measure the total energy coupled to the sensors. As shown in FIGS. 8 and 9, the voltage change is a function of time, which indicates that measuring the voltage change over time may be used to determine when a rare event has occurred. For multiple events, an array such as the sensor array 300 shown in FIG. 3 may be used to record each event.

Figure 10:
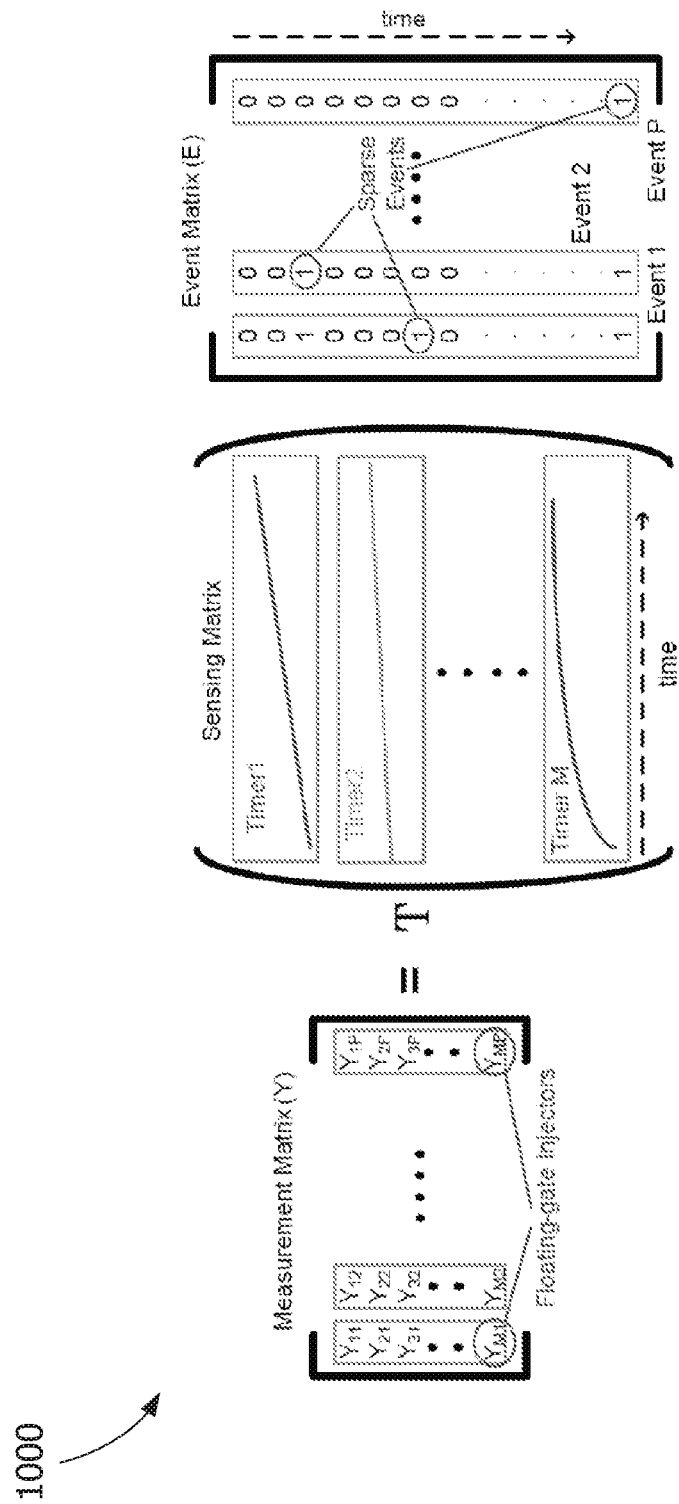
FIG. 10 is a graphical representation of an example matrix equation for reconstructing a plurality of events using a sensor array, such as the sensor array shown in FIG. 3.

FIG. 10 is a graphical representation of an example equation 1000 for a compressive sensing formulation for a sensor array, such as the sensor array 300 (shown in FIG. 3). In the example embodiment, Ei(n) denotes a Boolean variable signifying whether an event i, i=1, P (e.g., when the sensor signal has exceeded a threshold i) has occurred at a time-instant n, n=1, . . . , N. The event vectors Ei can be considered to be "sparse" with respect to time based on the frequency of the events i and the temporal space between the events i. The event vectors $E_i$, i=1, . . . P are clustered together into an event matrix $E \in R^N \times R^P$, where the y-axis denotes time. In a compressive sensing formulation, M measurements of the event vector Ei are made using a sensing matrix T formed by an array of sensors with different timer or electron leakage functions.

Incoherency is introduced by exploiting the non-linearity and mismatch between each of the sensor responses or by combining multiple sensor structures. Once a sensing matrix $T \in R^M \times R^N$ is computed, the measurement matrix $Y \in R^K \times R^P$ is determined by measuring the output the timer array according to Y=TE. As shown in FIG. 10, each sensor can be designed to have a different response (i.e., different electron leakage rate) with respect to each other. Also, the initial charge on the floating-gate in each of the sensors may be set to a different threshold which leads to a different response time. Each row of the measurement matrix T is chosen by sampling the different sensor responses.

The event reconstruction algorithm may be based on $L_1$ sparse decoding algorithms used in compressive sensing. In other embodiments, a different reconstruction algorithm may be used. In at least some instances, only the measurement matrix Y and the transformation matrix T are known. The event matrix E is reconstructed using a system of undetermined linear equations. The a priori knowledge of event sparsity may be imposed by minimizing the $L_1$ norm of the reconstructed event vector $\|E\|_1$ subject to the linear constraints Y=TE. The transformation matrix T is typically known a priori because the response of the sensor is generally pre-calibrated. In other embodiments, the event reconstruction algorithm may use the sensor responses as a set of over-complete basis vectors and apply basis pursuit or sparse regression method to determine E and hence the occurrence of the events.

Figure 11:
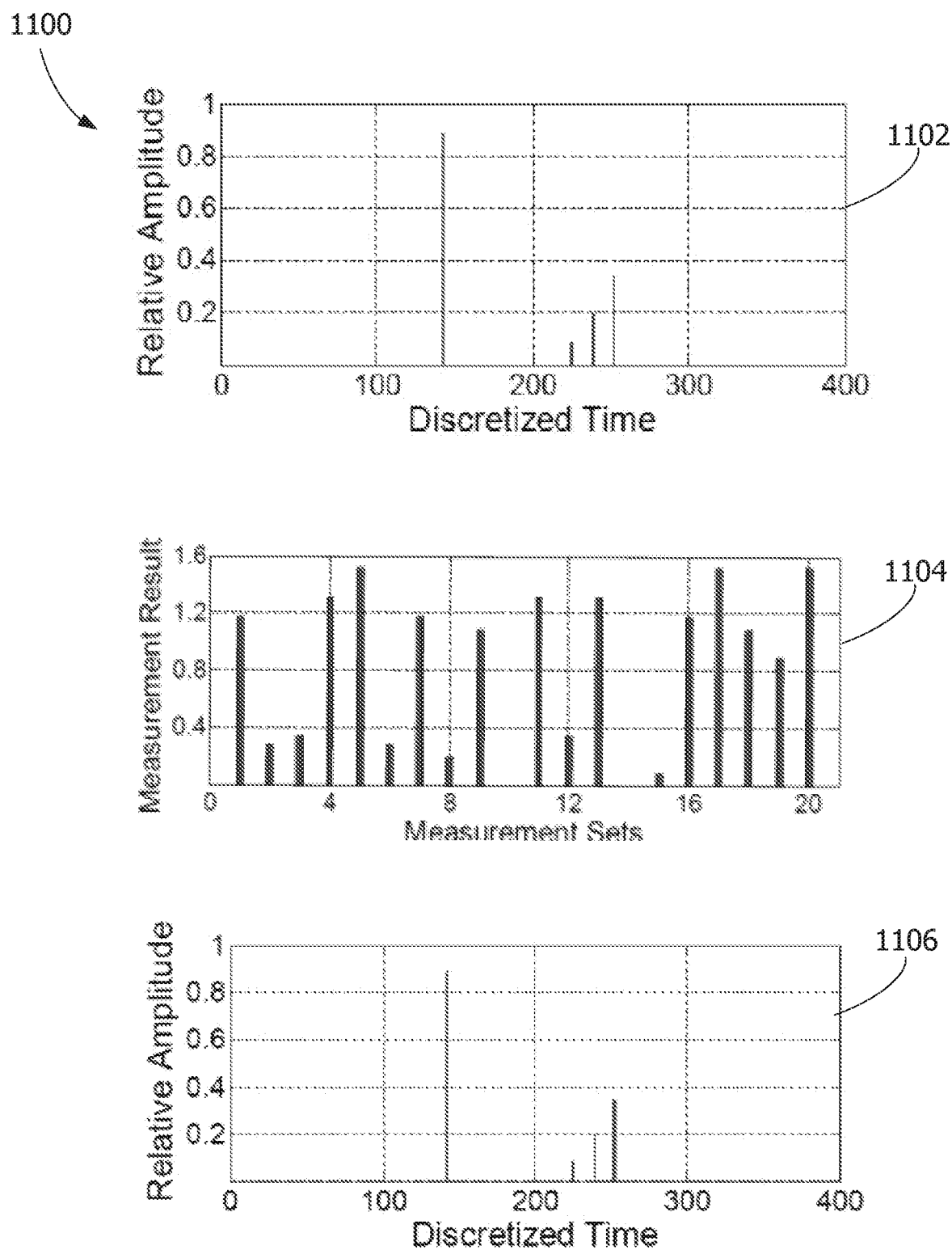
FIG. 11 is a group of graphs depicting the reconstruction of multiple events using a sensor array, such as the sensor array shown in FIG. 3.

FIG. 11 depicts a set of graphs 1100 depicting a preliminary result using a mathematical model obtained using data from example sensors. In the example embodiment, an array of twenty sensors monitor for events. A first graph 1102 includes four simulated events that are generated for the sensor array. The events are considered sparse with respect to each other and are directly sensed and stored on the floating-gates of the sensors. The stored data is then retrieved and the events are reconstructed using the knowledge of the sensor responses. In the example embodiment, a second graph 1104 depicts a magnitude or measurement retrieved from the memory device of each sensor. Using a $L_1$ sparse decoding algorithm with the measurements retrieved from the sensors, the events and the timestamp of the events may be reconstructed for analysis. A third graph 1106 depicts reconstructed events with timestamps. The first and third graphs 1102, 1106 substantially match, indicating that the events were successfully reconstructed.

In some embodiments, the sensors may be used to monitor temperature for temperature, sensitive items, such as food items and medicine in cold supply chain management. Ambient temperatures out of an appropriate range through the product life including within the supply chain and storage may cause drug failures and food affection leading to serious health and safety accidents. At least some conventional supply chain regulatory systems monitor the assets in batches, combined with a label of shelf lifetime attached to each product. However, failure to monitor the temperature of individual products may result in a decrease in the shelf life. For instance, the life of milk sold in supermarkets heavily depends on the storage temperature. Applying temperature sensors such as CMOS temperature sensors is impractical because those sensors requires continuous access to external power sources, which usually significantly increase the volume and cost.

Figure 12:
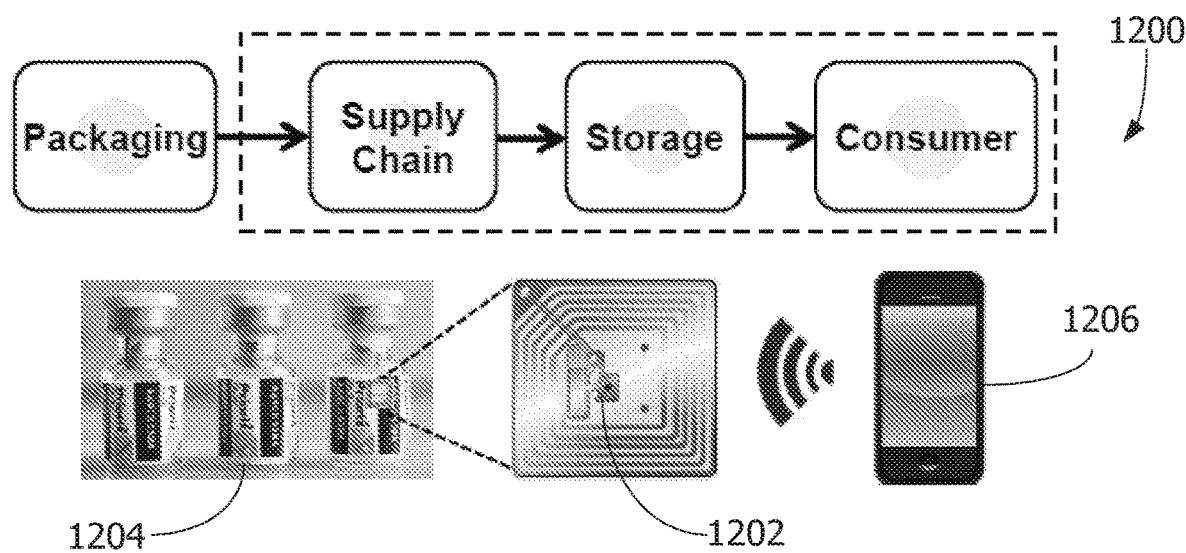
FIG. 12 is a diagram of an example supply chain management system using the sensors shown in FIG. 1 to monitor temperature.

The above-described sensors facilitate individual product temperature monitoring powered by ambient energy and facilitates temperature monitoring throughout the product life of a product. FIG. 12 is a diagram of an example supply chain management system 1200 using the sensors shown in FIG. 1. The system 1200 includes a sensor 1202 coupled to a container 1204 storing a temperature-sensitive product. As the tunneling process requires the assistance of thermal excitation, the characteristics of the sensor 1202 is a function of ambient temperature. The distribution of the electrons' energy is a function of the ambient temperature, which determines the overall tunneling ability through the energy barrier. Ambient temperature variation is captured by the sensor 1202. In at least some embodiments, the sensor 1202 does not include a transducer because the temperature variation is captured by the energy barrier. The programming and readout of the sensor 1202 is achieved using an interface 1206 (e.g., a smartphone or other computing device) powered by RF interrogation signals. Therefore, the sensor 1202 can maintain record of the ambient temperature across the whole life cycle of a product within the container 1204 (i.e., supply chain, storage, and consumer).

Figure 13:
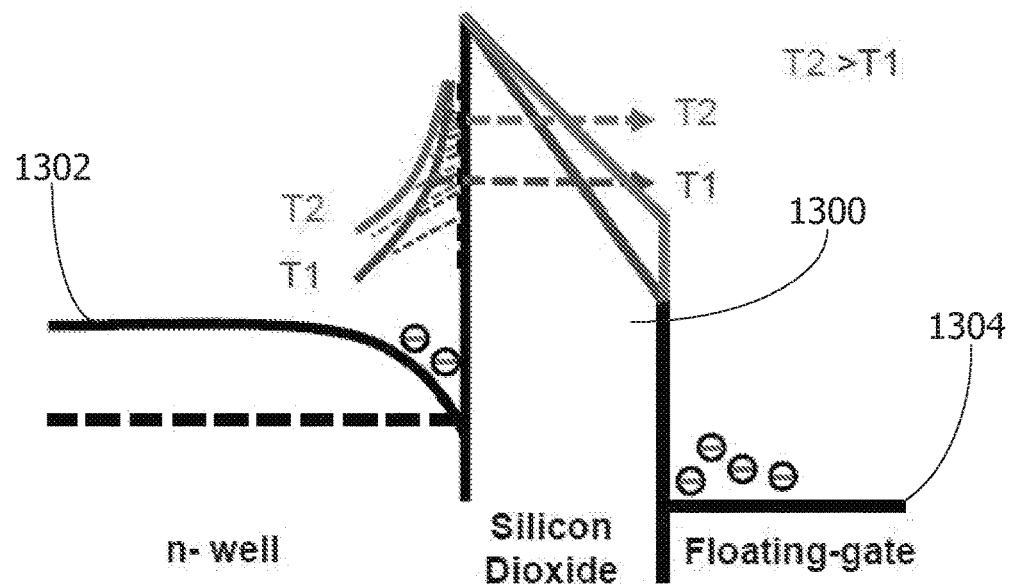
FIG. 13 is a graphical representation of an example energy barrier and the effects of modifying the ambient temperature of the barrier.

The temperature sensor 1202 relies on the two-step FN tunneling process in a floating-gate structure described above. FIG. 13 is a graphical representation of an energy barrier 1300 of the sensor 1202. The energy barrier 1300 is positioned between an n-well 1302 configured to store electrons and a floating-gate 1304. The energy barrier 1300 has a triangular geometry to facilitate electron leakage at a predetermined leakage rater. Electrons are first thermally activated to a high energy level in the n-well 1302 and then tunnel through the triangular barrier 1300 formed by the silicon dioxide in the floating-gate transistor 1304. The structure is configured to harvest thermal energy for the tunneling process, thereby eliminating the need for external power sources to monitor temperature. As the tunneling process requires the assistance of thermal excitation, the characteristics of the sensor are a function of ambient temperature. The distribution of the electrons' energy is a function of the ambient temperature and determines the overall tunneling ability through the energy barrier 1300. The voltage at the floating-gate 1304 is retrieved using RFID and/or other retrieval processes to determine a temperature of the product and a corresponding duration or timestamp at which the product has stayed at a particular temperature. In particular, the retrieved voltage is compared to a model for the sensor to determine the temperature and/or the timestamp. In at least some embodiments, an array of sensors is coupled to a container to monitor temperature. Each sensor is configured to have a different response (i.e., different leakage rates) to enable increased precision of temperature changes and the corresponding timestamps.

The effect of thermal activation and electron tunneling on the current density J (Equation 1) is shown in Equation 9. The current density J is a function of a transmission parameter of the tunnel interface, a probability density function $P_T(\zeta)$ corresponding to an electron occupying an energy level $\zeta$, and the tunneling probability $T(\zeta)$ of the electron.

$$J = \frac{q}{h}\gamma \int_{-\infty}^{\infty} P_T(\zeta)T(\zeta)d\zeta \quad (9)$$

A more complete expression for the FN tunneling current density J is shown in Equation 10. Equation 10 includes explicit dependence on temperature $\gamma(T)$ and two correction terms $t(y)$ and $v(y)$ which captures the lowering of the triangular tunneling barrier though an image force effect.

$$J = \alpha \frac{1}{t^2(y)}\gamma(T)E^2 \exp\left(-\frac{\beta v(y)}{E}\right) \quad (10)$$

The correction terms $t(y)$ and $v(y)$ are tabulated elliptic integrals, and y is a function of the barrier height $\phi$ and electric field E as shown in Equation 11.

$$y = \frac{1}{\phi}\left(\frac{q^3 E}{4\pi\epsilon_r\epsilon_0}\right)^{1/2} \quad (11)$$

Although the tunneling process itself is temperature independent, the number of electrons of a given incident energy on the barrier and the barrier height $\varphi$ are functions of temperature. The dependence of electron momentum distribution on temperature is corrected using $\gamma(T)$, which is shown in Equation 12.

$$\gamma(T) = \frac{\pi ckT}{\sin(\pi ckT)} \text{ where } c = \frac{4\pi(2m*\phi)^{\frac{1}{2}}t(y)}{hqE} \quad (12)$$

To include the effects of temperature in the floating-gate voltage $V_{fg}$, Equation 7 is modified as shown in Equation 13.

$$V_{fg} = \frac{k_2}{\ln(k_1 t + k_0)} + V_{sub} \quad (13)$$

where $$k_0 = \exp\left(\frac{\beta}{E_0}\right), k_1 = \frac{A\alpha\beta}{C_T t_{ox}},$$

$$k_2 = \beta' t_{ox}, a' = \alpha \frac{1}{t^2(y)}\gamma(T), \beta' = \beta v(y)$$

For time intervals $t > t_0 \gg k_0/k_1$, the change in the floating-gate voltage $\Delta V_{fg}$ is shown in Equation 14. Considering the fact that $k_2$ is a relatively weak function of the temperature T, Equation 14 implies that the change of the floating-gate voltage $V_{fg}$ for different temperatures after the initial transient phase will be substantially identical to each other.

$$\Delta V_{fg}(t) = \frac{k_2(\ln t_0 - \ln t)}{\ln t_o \ln t} \quad (14)$$

In an example experiment, the sensor is programmed to the same value for different temperatures $T_1$, $T_2$. The sensor associated with a temperature $T_2$ which is larger than $T_1$, has an electron distribution with a larger average energy. Since the electric field is substantially identical for the two sensors, the timer associated with the temperature $T_2$ demonstrates a larger initial tunneling rate. However, over time, the floating-gate voltage $V_{fg}$ of the $T_2$ sensor is smaller than that of the $T_1$ sensor, which implies electrons of the $T_2$ sensor have to tunnel through a thicker effective energy barrier, thereby leading to a smaller tunneling probability. After a certain period which is defined as the transient phase, the sensor enters into an equilibrium phase where the temperature effect is canceled by the voltage difference on the floating-gate. Therefore, the difference of the floating-gate voltage $V_{fg}$ in the equilibrium phase is a function of temperature, which can be used for time-stamped temperature monitoring.

The design of the sensors enables not only monitoring the temperature, but also keeping track of the time. In the example embodiment, the sensors facilitate modifying and adjusting the duration of the monitoring period and the time difference across different temperature for different applications. For instance, in the example experiment, for temperature $T_1$, the timing sensor reaches the target floating-gate voltage value $V_{fg0}$ at time $t1$, while for temperature $T_2$, it reaches the target floating-gate voltage value $V_{fg0}$ at time $t_2$. $t_2-t_1$ may be controllable by adjusting the design parameters for various applications. One design parameter that may achieve this level of control is the floating-gate capacitance $C_T$. Assuming in equilibrium state, since the tunneling current is only determined by the tunneling junction area and the electric field, the dependence of the voltage difference on temperature difference is independent of the gate capacitance $C_T$. However, a leakage rate $dΔV_{fg}$ (i.e., voltage change with respect to time) is inverse proportional to the gate capacitance $C_T$. the leakage rate $dΔV_{fg}$ is expressed in Equation 15. Although temperature sensitivity is independent of the gate capacitance $C_T$, the speed to reach the equilibrium state is a function of gate capacitance. For example, a larger gate capacitance $C_T$ leads to a longer time to reach equilibrium state.

$$ΔV_{fg} = \frac{J(V_{fg1}, T_1) - J(V_{fg2}, T_2)}{C_T} dt \quad (15)$$

Figure 14:
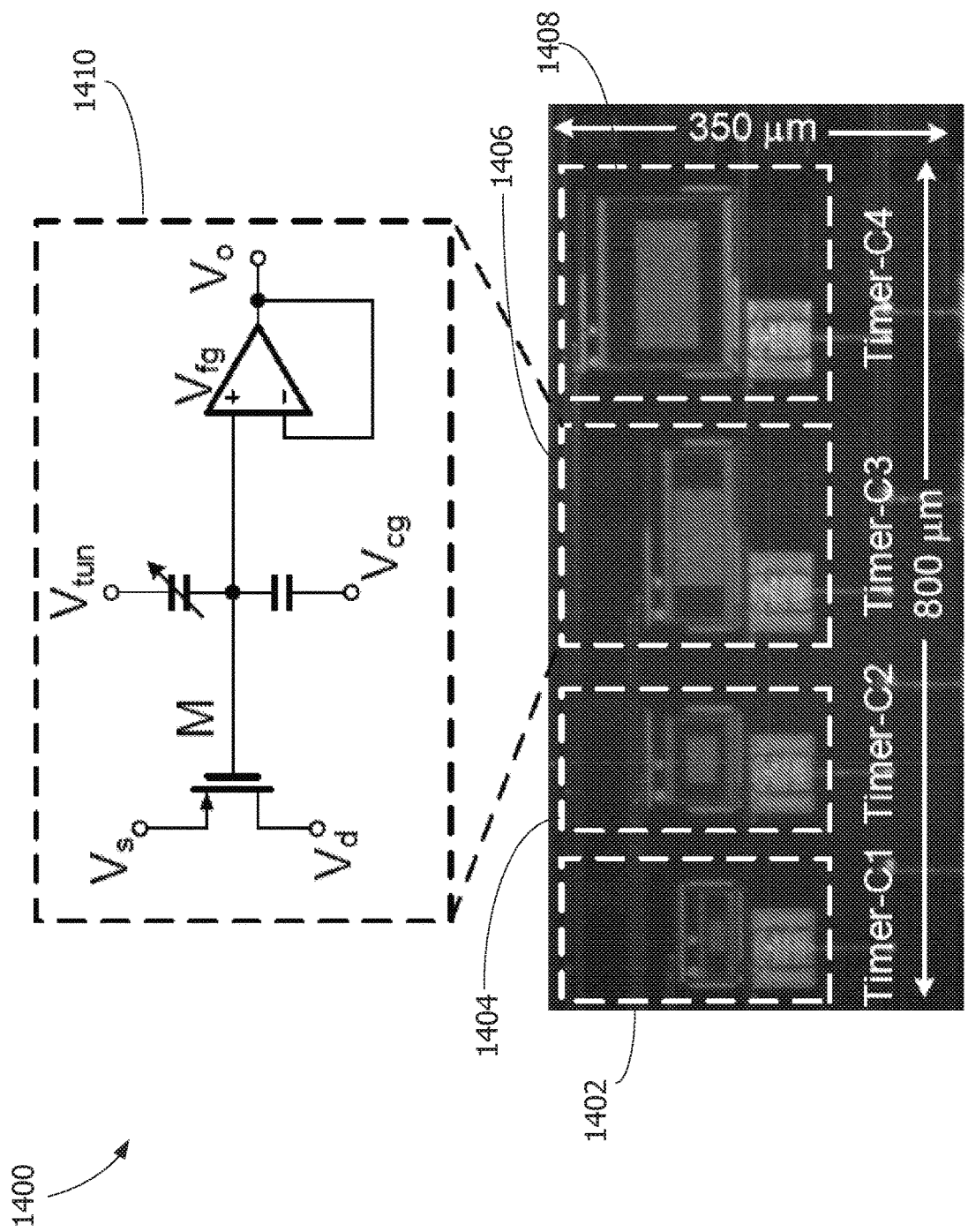
FIG. 14 is a schematic diagram of an example array of sensors including sensor systems similar to the system shown in FIG. 1.

FIG. 14 is a schematic diagram of an example array of sensors 1400 including sensor systems similar to the system shown in FIG. 1. An example experiment was conducted using the array 1400 to demonstrate the effects of gate capacitance and temperature. In the example experiment, the array 1400 is fabricated using a standard 0.5 μm CMOS process. The array 1400 includes a first sensor 1402 having a gate capacitance of 2 pF, a second sensor 1404 having a gate capacitance of 4 pF, a third sensor 1406 having a gate capacitance of 8 pF, and a fourth sensor 1408 having a gate capacitance of 16 pF. A circuit diagram 1410 representing the third sensor 1406 is shown. The floating-gate is formed by the gate of a pMOS transistor which is also used for programming an initial charge onto the floating-gate.

FN tunneling removes the electrons from the floating-gate node by applying a high-voltage (e.g., 15V) across a parasitic nMOS capacitor. Hot-electron injection, however, requires lower voltage (4.2 V in the 0.5 μm CMOS process) than tunneling and hence is the primary mechanism for precise programming of floating-gates. In some embodiments, the hot-electron programming procedure includes applying greater than 4.2 V across the source and drain terminals of the transistor M. The relatively large electric field near the drain of the pMOS transistor creates impact-ionized hot-electrons. When the energy of the hot-electrons exceeds the gate-oxide potential barrier (e.g., 3.2 eV), the hot-electrons are injected onto the floating-gate. The process is controlled and periodically monitored to facilitate programming the floating-gate voltage to a desired precision because the hot-electron injection in a pMOS transistor is a positive feedback process and can only be used to add electrons to the floating-gate. The desired precision may be achieved, for example, either by adjusting the duration for which the floating-gate transistor is injected or by adjusting the magnitude of the injection pulses. To characterize the array 1400, a unity gain buffer is employed to readout the floating-gate voltage.

Figure 15:
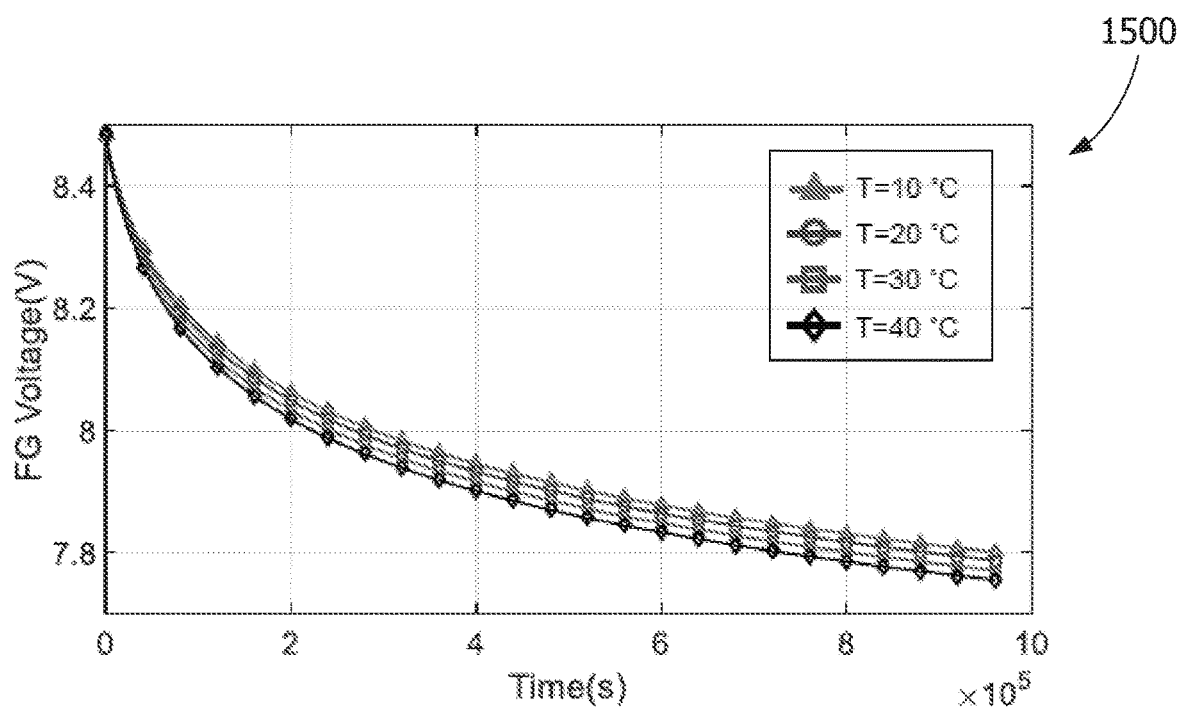
FIG. 15 is a graph of the floating-gate voltage of a first sensor shown in FIG. 14 with respect to time.
Figure 16:
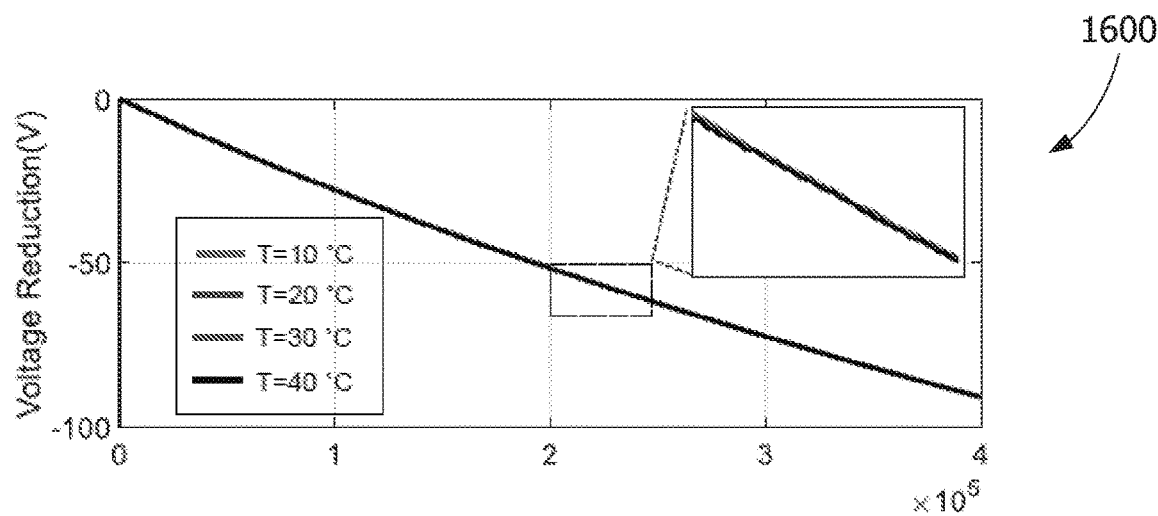
FIG. 16 is a graph of the floating-gate voltage change of the first sensor shown in FIG. 14 in the equilibrium phase after a reference time.
Figure 17:
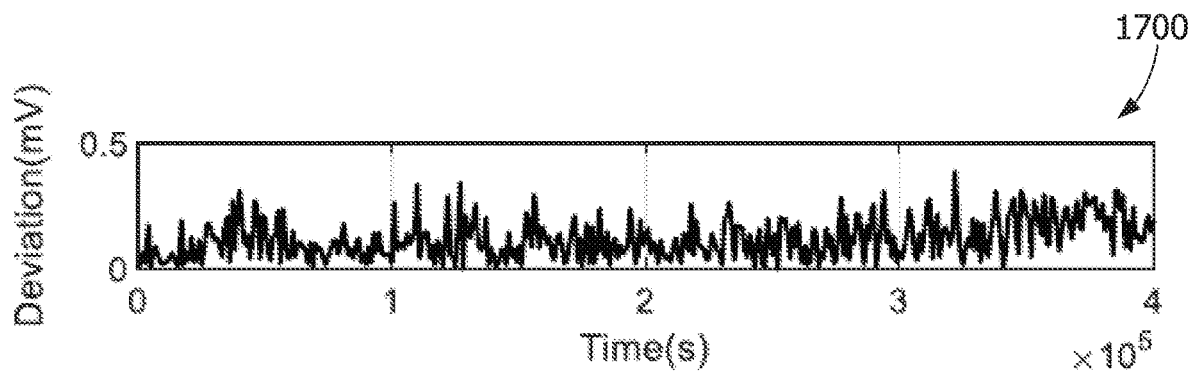
FIG. 17 is a graph of deviation among the different temperatures for the first sensor shown in FIG. 14.
Figure 18:
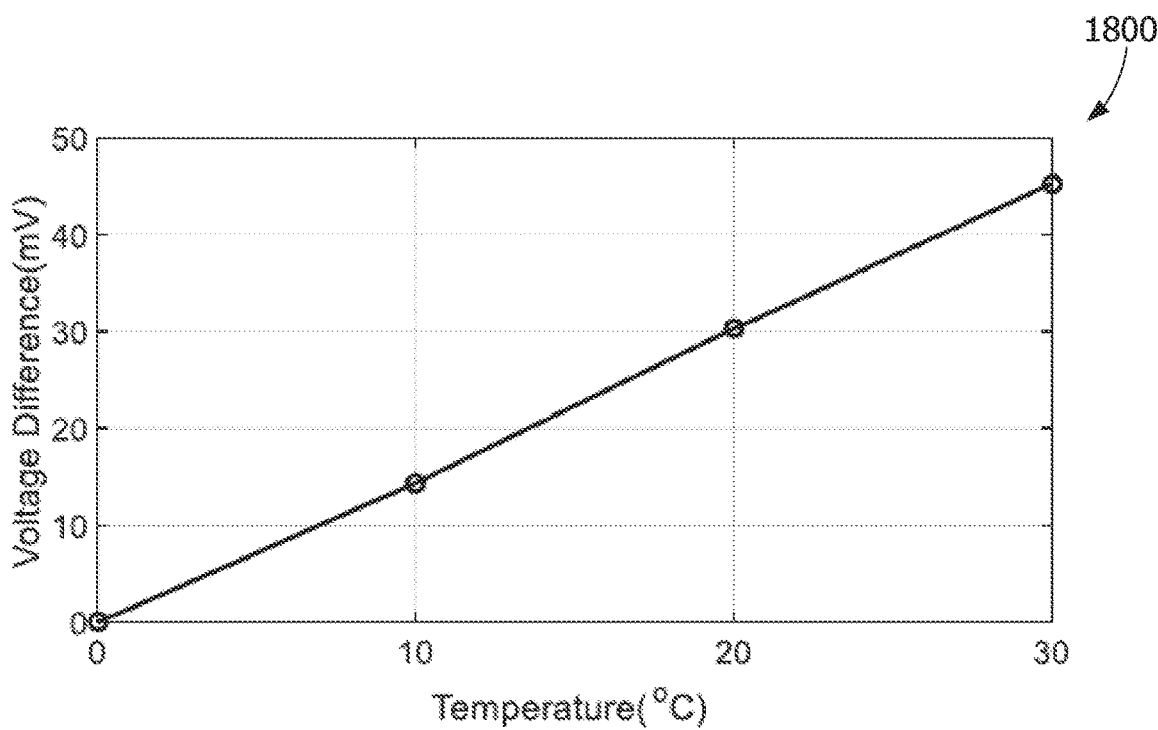
FIG. 18 is a graph of the relationship between the voltage difference and the temperature for the first sensor shown in FIG. 14.

The first group of experiments demonstrates the dependence of the sensor's response on temperature. The sensor 1402 with 54 μm² junction area and 2 pF gate capacitance was set in an environmental chamber accurate temperature control. The initial floating-gate voltage of the sensor 1402 was programmed accurately to 8.5V, and the dynamic responses were tested and measured for 10° C., 20° C., 30° C., and 40° C., respectively. FIG. 15 is a graph 1500 of the floating-gate voltage of the sensor 1402 with respect to time. The results were fitted using the model represented by Equation 13. The fitted curves match with the measured results to validate the correctness of the model. FIG. 16 is a graph 1600 of the floating-gate voltage change of the sensor 1402 in the equilibrium phase after a reference time of 5.6×10⁵ seconds, thereby verifying Equation 14. FIG. 17 is a graph 1700 of voltage deviation among the different temperatures for the sensor 1402. Graph 1700 implies that in the equilibrium region, there is a relatively stable constant voltage difference between the responses of different temperatures. FIG. 18 is a graph 1800 of the relationship between the voltage difference and the temperature. Graph 1800 depicts a linear dependence on temperature and a temperature sensitivity around 1.5 mV/° C. Graph 1800 also implies that if the temperature changes during the measured process, the equilibrium will be broken, and the response of the sensor 1402 may shift to a new equilibrium state corresponding to the new temperature.

Figure 19:
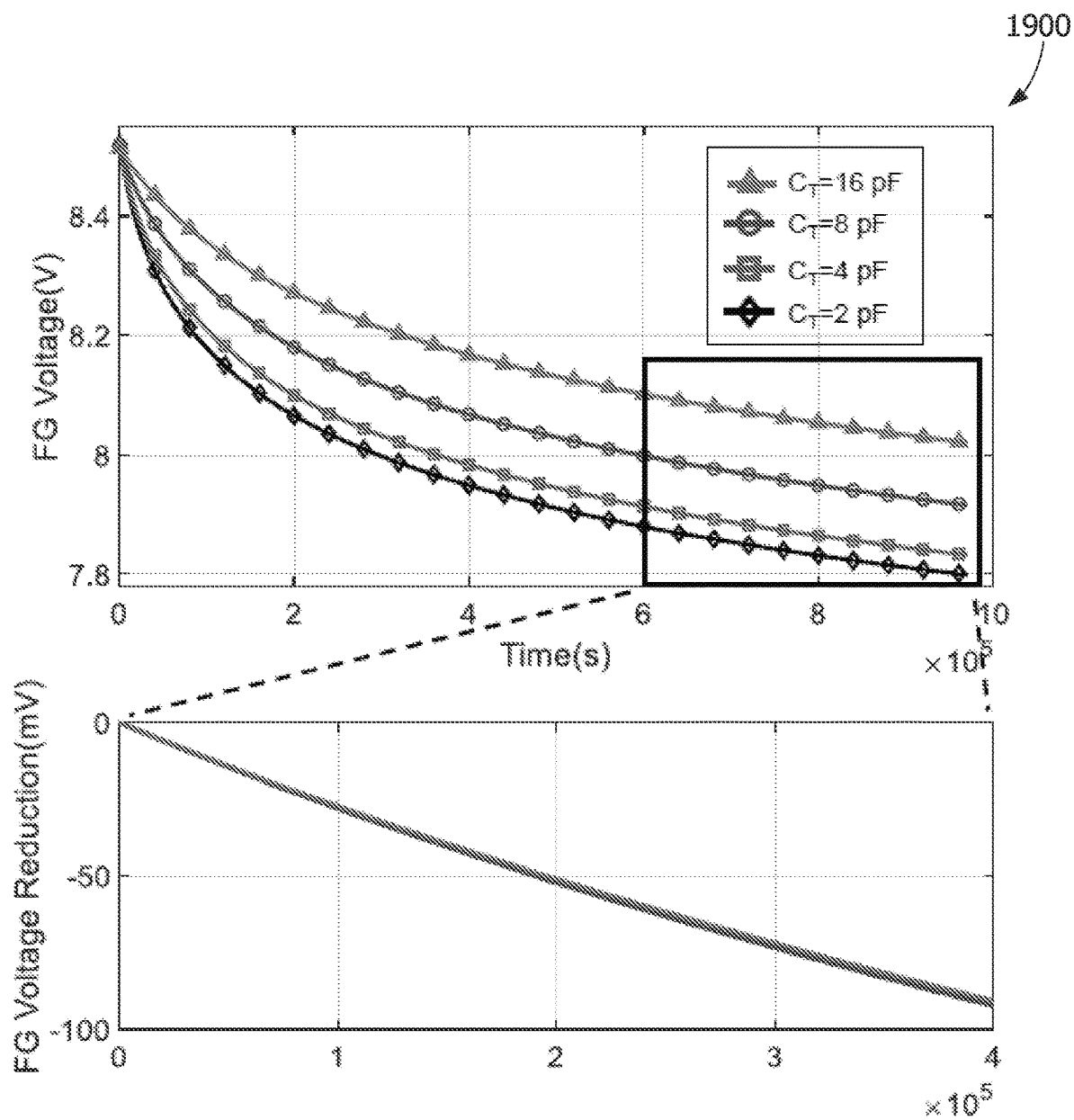
FIG. 19 is a graph of the measured sensor response with respect to time for each of the sensors shown in FIG. 14.

Another group of experiments was conducted to demonstrate the impact of gate capacitances on the sensor's behavior. The four sensors 1402, 1404, 1406, and 1408 were programmed to an initial voltage of 8.5V and put in the environmental chamber. The temperature was programmed to 10° C. and all the sensors' responses were measured and recorded. FIG. 19 is a graph 1900 of the measured response with respect to time for each of the sensors 1402, 1404, 1406, and 1408. The results validate that the temperature sensor is a function of the capacitance. However, in equilibrium state, the sensor's response to temperature is robust to gate capacitance as shown in graph 1900, where the voltage change after a reference time of 6×10⁵ is plotted. The maximum deviation is less than 2 mV. This makes the sensor suitable for long term temperature monitoring.

The above systems and methods enable long-term, self-powered monitoring for rare or sparse events for multiple applications. For example, the above systems and methods may be used in medical, mechanical, chemical, and/or other applications. The sensors may also be configured to monitor time to facilitate time stamping, such as for cold chain supply management. The sensors described above include non-volatile memory to enable periodical retrieval of sensor data instead of constantly monitoring the sensor. In addition, the systems and methods are configured to provide both a timestamp and measurement value for each event to facilitate reconstruction of the event as a function of time for additional analysis.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor system for detecting events, the sensor system comprising:
   a sensor comprising:
      a transducer configured to detect an event and generate a sensor signal in response to the event; and
      a memory device comprising a floating-gate with a sensing interface coupled to the transducer, the sensing interface having an energy barrier configured to leak electrons at a predetermined electron leakage rate through Fowler-Nordheim (F-N) tunneling, wherein the sensor signal is configured to alter a geometry of the energy barrier to change the electron leakage rate; and a read-out interface communicatively coupled to the memory device, the read-out interface configured to retrieve data stored on the memory device for analysis, wherein the event and a timestamp of the event are identifiable from the stored data.

2. The sensor system of claim 1, wherein the event and the timestamp are identifiable based on an initial state of the energy barrier and the changed electron leakage rate.

3. The sensor system of claim 2, wherein the initial state of the energy barrier includes an initial voltage and the predetermined electron leakage rate.

4. The sensor system of claim 1 further comprising a sensor array including a plurality of sensors, each sensor of the plurality of sensors comprising a memory device comprising a floating-gate with a sensing interface having an energy barrier configured to leak electrons at a predetermined electron leakage rate through F-N tunneling.

5. The sensor system of claim 4, wherein each sensor of the plurality of sensors comprises a transducer configured to detect an event and generate a sensor signal in response to the event.

6. The sensor system of claim 1, wherein the read-out interface is configured to be wirelessly interrogated by an external device using at least one of radio frequency (RF) communication and ultrasound communication, wherein the read-out interface is configured to transmit the data stored on the memory device when interrogated.

7. A sensor for detecting events, the sensor comprising:
a transducer configured detect an event and generate a sensor signal in response to the event; and
a memory device comprising a floating-gate transistor with a sensing interface coupled to the transducer, the sensing interface having an energy barrier configured to leak electrons at a predetermined electron leakage rate through Fowler-Nordheim (F-N) tunneling, wherein the sensor signal is configured to alter a geometry of the energy barrier to change the electron leakage rate, wherein the event and a timestamp of the event are identifiable from data stored on the memory device.

8. The sensor of claim 7, wherein the event and the timestamp are identifiable based on an initial state of the energy barrier and the changed electron leakage rate.

9. The sensor of claim 8, wherein the initial state of the energy barrier includes an initial voltage and the predetermined electron leakage rate.

10. A method for detecting events using a sensor including a transducer and a memory device including a floating-gate transistor with a sensing interface coupled to the transducer, the sensing interface having an energy barrier configured to leak electrons at a predetermined electron leakage rate through Fowler-Nordheim (F-N) tunneling, the method comprising:
detecting, by the transducer, an event;
generating a sensor signal in response to the event;
altering a geometry of the energy barrier in response to the sensor signal, wherein altering the geometry changes the electron leakage rate; and storing, at the floating-gate, data associated with the electron leakage rate, wherein the event and a timestamp of the event are identifiable from the stored data.

11. The method of claim 10, wherein the event and the timestamp are identifiable based on an initial state of the energy barrier and the changed electron leakage rate.

12. The method of claim 11, wherein the initial state of the energy barrier includes an initial voltage and the predetermined electron leakage rate.

13. The method of claim 10 further comprising wirelessly interrogating a read-out interface coupled to the memory device using at least one of radio frequency (RF) communication and ultrasound communication to retrieve the data stored on the memory device.

14. A sensor system for monitoring ambient temperature of an object, the sensor system comprising:
a sensor disposed adjacent an object, the sensor comprising a memory device comprising a floating-gate with a sensing interface having an energy barrier configured to leak electrons at a predetermined electron leakage rate through Fowler-Nordheim (F-N) tunneling, wherein the electron leakage rate varies at least partially as a function of an ambient temperature of the sensor; and
a read-out interface communicatively coupled to the memory device, the read-out interface configured to retrieve data stored on the memory device for analysis.

15. The sensor system of claim 14, wherein the predetermined electron leakage rate varies at least partially as a function of a gate capacitance of the floating-gate.

16. The sensor system of claim 15 further comprising an array of sensors disposed adjacent the object, the array of sensors including the sensor and at least one other sensor including a floating-gate, wherein the sensor and the at least one other sensors have different gate capacitances.

17. A method for monitoring ambient temperature of an object, the method comprising:
disposing a sensor adjacent the object, the sensor comprising a memory device comprising a floating-gate with a sensing interface having an energy barrier configured to leak electrons at a predetermined electron leakage rate through Fowler-Nordheim (F-N) tunneling, wherein the electron leakage rate varies at least partially as a function of an ambient temperature of the sensor;
altering a geometry of the energy barrier in response to a change in ambient temperature and thereby change the electron leakage rate; and
storing, at the floating-gate, data associated with the electron leakage rate.

18. The method of claim 17 further comprising wirelessly interrogating a read-out interface coupled to the memory device to retrieve the data stored on the memory device.

19. The method of claim 18, wherein wirelessly interrogating the read-out interface further comprises wirelessly interrogating the read-out interface with an external device using at least one of radio frequency (RF) communication and ultrasound communication, wherein the read-out interface transmits the data stored on the memory device to the external device when interrogated.

* * * * *